US012549897B2

(12) United States Patent
Souden et al.

(10) Patent No.: US 12,549,897 B2
(45) Date of Patent: Feb. 10, 2026

(54) DEVICE-INDEPENDENT AUDIO FOR ELECTRONIC DEVICES

(71) Applicant: Apple Inc., Cupertino, CA (US)

(72) Inventors: Mehrez Souden, Los Angeles, CA (US); Jason Wung, Santa Clara, CA (US); Jonathan D. Sheaffer, San Jose, CA (US); Joshua D. Atkins, Lexington, MA (US); Siyuan Yuan, Stanford, CA (US)

(73) Assignee: Apple Inc., Cupertino, CA (US)

( * ) Notice: Subject to any disclaimer, the term of this patent is extended or adjusted under 35 U.S.C. 154(b) by 272 days.

(21) Appl. No.: 18/522,108

(22) Filed: Nov. 28, 2023

(65) Prior Publication Data

US 2024/0267674 A1    Aug. 8, 2024

Related U.S. Application Data

(60) Provisional application No. 63/443,680, filed on Feb. 6, 2023.

(51) Int. Cl.
*H04R 3/00* (2006.01)
*G06N 20/00* (2019.01)

(52) U.S. Cl.
CPC ............. *H04R 3/005* (2013.01); *G06N 20/00* (2019.01)

(58) Field of Classification Search
CPC .......................... H04R 25/606; H04R 2460/13
USPC ..................................................... 381/95, 122
See application file for complete search history.

(56) References Cited

U.S. PATENT DOCUMENTS

| | | |
|---|---|---|
| 11,076,052 B2 | 7/2021 | Cartwright et al. |
| 2017/0270406 A1 | 9/2017 | Visser et al. |
| 2021/0304777 A1 | 9/2021 | Kim et al. |
| 2025/0131906 A1* | 4/2025 | Xiao ................ G10K 11/17857 |

* cited by examiner

*Primary Examiner* — Ammar T Hamid
(74) *Attorney, Agent, or Firm* — BAKERHOSTETLER (57) ABSTRACT

Aspects of the subject technology relate to providing device-independent audio for electronic devices. In one or more implementations, microphone data captured by multiple microphones at an electronic device may be provided to a device-specific audio generalizer at the electronic device. The device-specific audio generalizer may utilize device specific information to generalize the microphone data to form device-independent audio data. The device-independent audio data may then be provided to a device-independent machine learning model at the electronic device or another electronic device for further processing.

26 Claims, 8 Drawing Sheets

DEVICE-INDEPENDENT AUDIO FOR ELECTRONIC DEVICES

CROSS REFERENCE TO RELATED APPLICATIONS

This application claims the benefit of priority to U.S. Provisional Patent Application No. 63/443,680, entitled, "Device-Independent Audio For Electronic Devices", filed on Feb. 6, 2023, the disclosure of which is hereby incorporated herein in its entirety.

TECHNICAL FIELD

The present description relates generally to electronic processing of audio, including, for example, device-independent audio for electronic devices.

BACKGROUND

Electronic devices often include a microphone for capturing audio from the physical environment of the electronic device. In some cases, an electronic device attempts to extract audio, generated by single one of multiple audio sources, from the audio captured by the microphone.

BRIEF DESCRIPTION OF THE DRAWINGS

Certain features of the subject technology are set forth in the appended claims. However, for purpose of explanation, several aspects of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

An audio input that is captured by a set of microphones will result in microphone data from the microphones that includes a representation of the audio input with features that are specific to that set of microphones (e.g., specific to the characteristics of the individual microphones and/or the physical locations of the microphones). These microphone features in the microphone data can make the separation of audio sources in the audio data challenging without providing large source separation models that are specifically trained on audio data for that arrangement of microphones. However, it can also be challenging to provide such large source separation models, particularly, for example, in devices with limited processing resources, such as wearable devices.

Aspects of the subject technology relate to generalizing audio data from a specific set of multiple microphones into audio information that is independent of the specific set of multiple microphones, and then providing that audio information to a source separation model that is trained on device-independent audio data and that can be used on and/or by various types of electronic devices for source separation.

Figure 1:
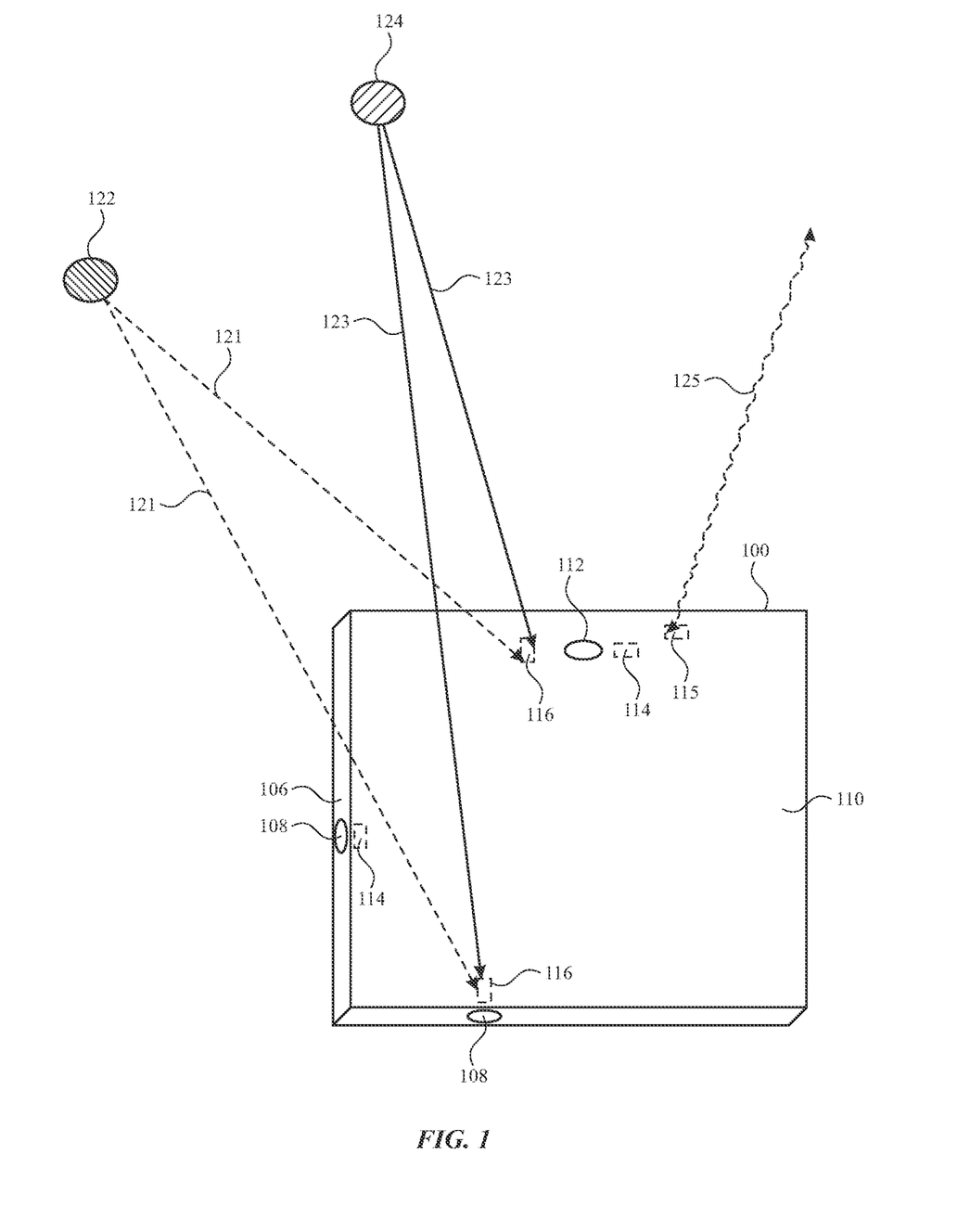
FIG. 1 illustrates a perspective view of an example electronic device in a physical environment with one or more sources of sound in accordance with various aspects of the subject technology.

An illustrative electronic device is shown in FIG. 1. In the example of FIG. 1, electronic device 100 includes one or more microphones 116. The electronic device 100 may also include one or more speakers 114. As shown, the electronic device 100 may also include a display such as display 110 mounted on the front of a housing 106. Electronic device 100 may include one or more input/output devices such as a touch screen incorporated into display 110, a button, a switch, a dial, a crown, and/or other input output components disposed on or behind display 110 or on or behind other portions of housing 106. Display 110 and/or housing 106 may include one or more openings to accommodate a microphone, a speaker, a light source, a camera, a button, or a switch (as examples).

In the example of FIG. 1, housing 106 includes openings 108. For example, openings 108 may form one or more ports for an audio component. In the example of FIG. 1, one of the openings 108 forms a speaker port for a speaker 114 disposed within the housing 106, and another of the openings 108 forms a microphone port for a microphone 116 disposed within the housing. In this example, one of the speakers 114 is aligned with a corresponding opening 108 to project sound through a corresponding opening 108, and one of the microphones 116 is aligned with another corresponding opening 108 to receive sound through the corresponding opening. In other implementations, a speaker 114 and/or a microphone 116 may be offset from a corresponding opening 108, and sound may be routed through the corresponding opening 108 from the speaker 114 or to the microphone 116 by one or more internal device structures.

In the example of FIG. 1, display 110 also includes an opening 112. For example, opening 112 may form a port for one or more audio components. In the example of FIG. 1, the opening 112 forms a speaker port for a speaker 114 disposed within the housing 106 and behind a portion of the display 110, and a microphone port for a microphone 116 disposed within the housing 106 and behind a portion of the display 110. In this example, the speaker 114 and the microphone 116 are offset from the opening 112. In this example, sound from the speaker may be routed to and through the opening 112 by one or more device structures. In this example, sound from the external environment of the electronic device may be routed from the opening 112 to the microphone 116 by one or more device structures. In other implementations, a speaker 114 and/or a microphone 116 may be aligned with a corresponding opening 108 or opening 112.

In the example of FIG. 1, the electronic device 100 is shown as having two microphones 116 and two speakers 114. However, this is merely illustrative, and the electronic device 100 may include one speaker, two speakers, three speakers, four speakers, or more than four speakers and/or one microphone, two microphones, three microphones, four microphones, five microphones or more than five microphones. In various use cases, two or more microphones of the electronic device 100 may be operated independently or cooperatively (e.g., as a beamforming microphone array). In various use cases, two or more speakers of the electronic device 100 may be operated independently or cooperatively (e.g., as a beamforming speaker array).

Microphones 116 may be configured to detect sounds in a human audible range (e.g., audio having one or more frequencies between approximately twenty Hertz and twenty kilohertz (kHz), and/or audio in an ultrasonic frequency range (e.g., audio having one or more frequencies above twenty kHz). For example, each of the microphones 116 may be operated (e.g., by a processor of the electronic device 100) to generate microphone signals or microphone data responsive to audio input received at the microphones (e.g., from the physical environment of the electronic device).

For example, as illustrated in FIG. 1, the microphones 116 may each receive an audio input 121 (e.g., sound) from a first audio source 122 and an audio input 123 from a second audio source 124. For example, the first audio source 122 may be a person, and the audio input 121 may include voice of the person (e.g., a user of the electronic device or another person). For example, the first audio source 122 may be a user of the electronic device 100 speaking into the electronic device, such as for operation of a voice call application, a video conferencing application, an audio conferencing application, a recording application, a voice-assistant application, or any other application that operates based on audio inputs to the electronic device that includes the microphone. The audio input 123 may include other sounds, such as ambient sounds, voices of one or more other people speaking in the physical environment of the electronic device, alarms, car horns, traffic noise, music, or any other environmental sounds from the physical environment of the electronic device 100.

In one or more implementations, it may be desirable to be able to separate out various different portions of the audio input to the microphones 116 from the various audio sources. For example, if the user of the device is conducting a phone call, an audio conference, or a video conference, it may be desirable to separate out the voice of the user from the other audio inputs, for transmission to one or more other devices and/or for output by one or more of the speakers 114 as a self-voice feedback. As another example, when recording audio and video with the electronic device, it may be desirable to be able to associate the locations of the first audio source 122 and the second audio source 124 with images of those audio sources in the recorded video (e.g., in order to be able to provide spatial and/or cinematic audio with the recorded video at playback). For example, in one or more implementations, it may also be desirable to be able to playback recorded audio in a spatial and/or cinematic audio presentation in which the audio output is spatially distributed in a way that matches the spatial distribution of the first audio source 122 and the second audio source 124. As another example, if the user of the device is attempting to operate a voice-activated or voice-controlled function or application of the electronic device, it may be desirable to separate out the voice of the user from the other audio inputs, and to provide only the voice of the user to the voice-activated or voice-controlled function or application of the electronic device.

The microphone data generated by the microphones 116 responsive to the audio inputs 121 and 123 depends on the relative locations of the microphones 116 to each other and to the first audio source 122 and the second audio source 124. For example, because the second audio source 124 is closer to the microphone 116 that receives audio input via the opening 112 than the microphone 116 that receives the audio input via the opening 108, the amplitude of the portion of the microphone signal generated by closer microphone responsive to the audio input 123 will be larger than the amplitude of the portion of the microphone signal generated by further microphone responsive to the audio input 123. In this way, the microphone data (e.g., the microphone signals) includes (e.g., encodes) information about the relative locations of the microphone 116 to the second audio source 124 (and similarly to any other audio sources in the physical environment). Thus, the microphone data generated by the microphones 116 may include a representation of the audio input 121 and the audio input 123 that includes one or more features that correspond to the respective locations of the microphones 116. Moreover, because the various microphones 116 are disposed in various different areas of the electronic device 100, the local acoustic environment for each microphone may be specific to the area of the electronic device within which that microphone is disposed. For this reason, it can be challenging to process and/or represent recorded incoming sounds in a way that is not dependent on the recording device acoustics and/or layout.

In one or more implementations of the subject technology, the electronic device 100 may generalize (e.g., as described in further detail hereinafter) the microphone data to generate a representation of the audio input to the electronic device (e.g., a representation of the audio input 121 and the audio input 123) that is independent of the locations of the microphones 116 (e.g., and thus independent of the electronic device 100). This device-independent representation of the audio input then can be played back in any desired spatial pattern. As described in further detail hereinafter, this device-independent representation of the audio input can also be provided to a machine learning model for feature separation and/or extraction.

As shown in FIG. 1, electronic device 100 may include communications circuitry 115. Communications circuitry 115 may include WiFi communications circuitry, Bluetooth communications circuitry, near-field communications circuitry, Global Positioning System (GPS) communications circuitry, and/or other communications circuitry for communication with other electronic devices and/or servers directly and/or over one or more networks including local area networks and/or wider area networks including the Internet. In one or more implementations, source-separated audio data may be transmitted in a communication 125 (e.g., a wired or wireless communications output) from the communications circuitry 115 to one or more other electronic devices. As described in further detail hereinafter, in one or more implementations, the electronic device may transmit, using communications circuitry 115, audio information (e.g., a representation of an audio input to the microphones 116 that is independent of the microphones 116 and/or the electronic device 100) to another electronic device (e.g., a companion electronic device of the same user, and/or to a remote server following authorization from the user) for audio source separation at the other electronic device.

In various implementations, the housing 106 and/or the display 110 may also include other openings, such as openings for one or more microphones, one or more pressure sensors, one or more light sources, or other components that receive or provide signals from or to the environment external to the housing 106. Openings such as opening 108 and/or opening 112 may be open ports or may be completely or partially covered with a permeable membrane or a mesh structure that allows air and/or sound to pass through the openings. Although two openings 108 and one opening 112 are shown in FIG. 1, this is merely illustrative. One opening 108, two openings 108, or more than two openings 108 may be provided on the one or more sidewalls of the housing 106, on a rear surface of housing 106 and/or a front surface of housing 106. One opening 112, two openings 112, or more than two openings 112 may be provided in the display 110. In some implementations, one or more groups of openings in housing 106 and/or groups of openings 112 in display 110 may be aligned with a single port of an audio component within housing 106. Housing 106, which may sometimes be referred to as a case, may be formed of plastic, glass, ceramics, fiber composites, metal (e.g., stainless steel, aluminum, etc.), other suitable materials, or a combination of any two or more of these materials.

The configuration of electronic device 100 of FIG. 1 is merely illustrative. In one or more implementations, the electronic device 100 may be implemented using a housing that is sufficiently small to be portable and carried or worn by a user (e.g., electronic device 100 of FIG. 1 may be a handheld electronic device such as a tablet computer or a cellular telephone or smart phone, or a wearable device such as a smart watch, a pendant device, a headlamp device or other head mountable device, headphones, earbuds, or the like). In other implementations, electronic device 100 may be a computer such as a computer that is integrated into a display such as a computer monitor, a laptop computer, a media player, a gaming device, a navigation device, a computer monitor, a television, or other electronic equipment. In one or more implementations, housing 106 may include one or more interfaces for mechanically coupling housing 106 to a strap or other structure for securing housing 106 to a wearer.

Figure 2:
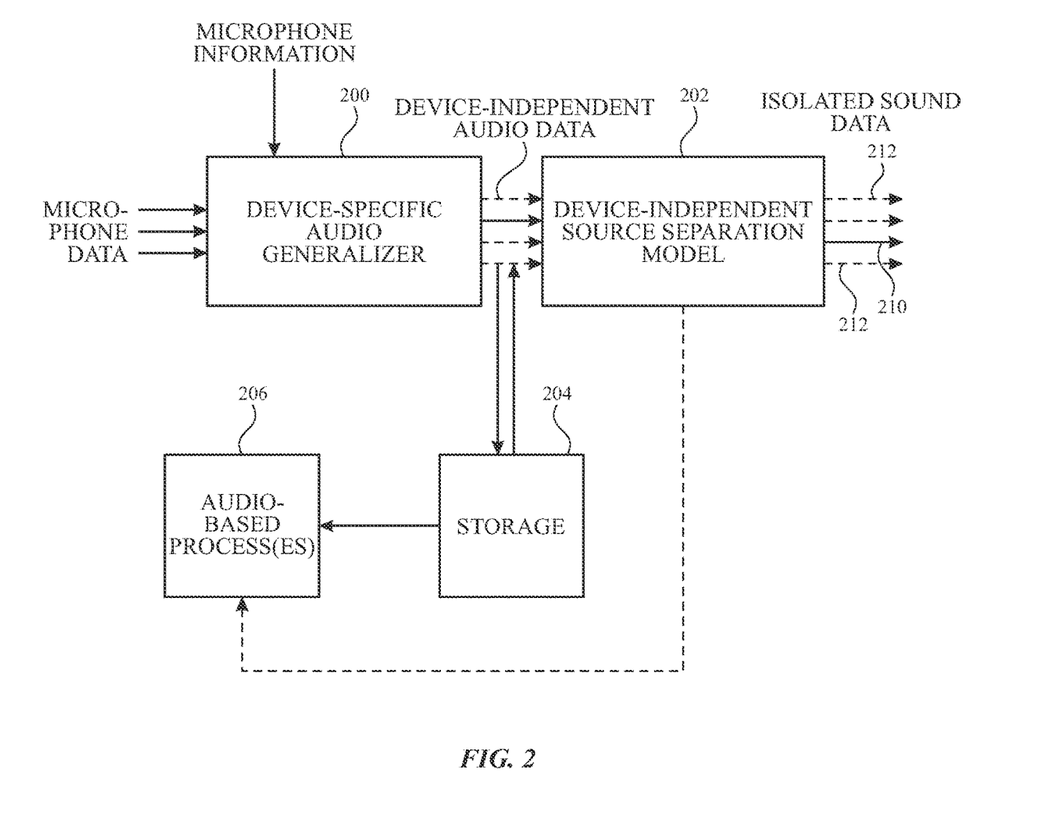
FIG. 2 illustrates a schematic diagram of an electronic device providing device-independent audio data to a source-separation model in accordance with various aspects of the subject technology.

FIG. 2 illustrates a schematic diagram of a process that may be performed for generating device-independent audio by one or more electronic devices. As shown in FIG. 2, microphone data (e.g., a microphone signal from each of multiple microphones 116 of an electronic device, such as the electronic device 100 of FIG. 1) may be provided to a device-specific audio generalizer 200. The microphone data may have been generated by the microphones 116 responsive to receiving an audio input (e.g., the audio input 121 and/or the audio input 123) at the microphones 116. The microphone data may include a first representation of the audio input that includes one or more features corresponding to the microphones 116 (e.g., corresponding to the characteristics of the microphones themselves, the local acoustic environment of the microphones, and/or to the respective locations of the microphones 116 in or on the electronic device 100). For example, the first representation may include one channel of audio data for each microphone 116.

The device-specific audio generalizer 200 may be a hardware and/or software processing block that generates, based on the microphone data, device-independent audio data. For example, the device-independent audio data may include a second representation of the audio input, different from the first representation of the audio input, that is independent of the microphones 116 (e.g., independent of audio features generated by the individual microphones themselves, independent of the local acoustic environment of each microphone, and/or independent of the respective locations of the microphones 116). Further details of the device-specific audio generalizer 200 are described hereinafter in connection with, for example, FIGS. 3 and 4.

As shown, the device-specific audio generalizer may also receive microphone information for the microphones (e.g., microphones 116) that obtained the audio input and generated the microphone data. The microphone information may include information indicating acoustic features of the multiple microphones and/or the respective locations of multiple microphones, and/or may include training data generated from microphones in the same respective locations paired with a "cleaned" version of that same audio, e.g., after manually editing/adjusting/filtering the audio to remove the device-specific features. The microphone information may be provided together with the microphone data, or may be provided to the device-specific audio generalizer 200 prior to providing the microphone data (e.g., as input training data for a machine learning model).

The device-independent audio data may include audio content corresponding to the audio input and the spatial characteristics of the audio input (e.g., the locations of one or more audio sources in the physical environment of the electronic device), represented in a format (e.g., a second representation) that is independent of the locations of the microphones 116 and/or other characteristics of the microphones 116. As shown, the device-independent audio data may be provided to a device-independent source separation model 202. The device-independent source separation model 202 may include a neural network trained to output audio corresponding to individual input audio sources, responsive to receiving the device-independent audio data with features corresponding to one or multiple input audio sources.

For example, the microphone data may include a first representation of audio content corresponding to the audio input 121 from the first audio source 122 of FIG. 1 and the audio input 123 from the second audio source 124 of FIG. 1. The first representation may include characteristics and/or features that are specific to the locations of the microphones 116 of the electronic device. The device-independent audio data may include a second representation of the audio content corresponding to the audio input 121 from the first audio source 122 and the audio input 123 from the second audio source 124 of FIG. 1, without including characteristics or features that are specific to the locations of the microphones 116. The device-independent source separation model 202 may output isolated sound data. The isolated sound data may represent audio content corresponding to a single one of the audio sources. For example, the isolated sound data may include an audio output signal 210 with audio content corresponding to (e.g., only) the audio input 121 from the first audio source 122 (e.g., with the audio content corresponding to the audio input 123 from the second audio source 124 removed and/or provided in a separate output channel from the device-independent source separation model 202).

The device-independent source separation model 202 may be trained and configured to output a single audio channel for a single input source or single type of input source, or to output multiple audio channels each corresponding to a single input source or single type of input source. For example, the device-independent source separation model 202 may also output an audio output channel 212 including audio content corresponding to the audio input 123 of the second audio source 124. For example, the audio output signal 210 may be a voice channel encoding a voice of a user of the electronic device 100 and the audio output channel 212 may include an ambient noise channel encoding ambient noise in the physical environment of the electronic device 100. In one or more implementations, the device-independent source separation model 202 may output multiple audio channels 212 encoding sounds from multiple individual audio sources in the physical environment of the electronic device 100.

The device-independent source separation model 202 may include a neural network trained using device-independent audio data (e.g., audio training data that has been generalized to remove features corresponding to device-specific acoustics and/or layout, and/or audio training data from many different types of devices with many different microphone acoustics and/or layouts). In this way, a device-independent source separation model 202 can be provided that can be deployed at any of various electronic devices having any of various device types (e.g., smart speakers, earbuds, headphones, smart watches, smartphones, tablet devices, laptop computers, desktop computers, set top boxes, etc.) and/or any of various microphone acoustics and/or layouts. This can be beneficial, as the device-independent source separation model 202 may be a relatively large machine learning model (e.g., having a relatively large number of nodes and a corresponding relatively large number of weights and/or other parameters) to perform high quality source separation, and the device-independent source separation model 202 can be trained, stored, and/or executed at a remote device on behalf of one or more at resource-limited devices, in some implementations and/or use cases.

Moreover, the device-independent source separation model 202 may be applied to audio data recorded by any other electronic device using any arrangement of microphones, once the microphone data from that other electronic device has been generalized using a device-specific audio generalizer 200 for that other electronic device. In one or more implementations, the device-specific audio generalizer 200 may perform operations that are based on information (e.g., microphone information) about the device having the microphones that generated the microphone data, and the device-independent source separation model 202 may perform operations that are independent of the information (e.g., microphone information) about the device having the microphones that generated the microphone data.

As shown in FIG. 2, in one or more implementations, the device-independent audio data may be stored in storage 204 (e.g., memory of the electronic device 100). In one or more implementations, the device-independent audio data may be stored in the storage 204 (e.g., as mp3, acc, ogg, wma, mp4, mov, wmv, flv, avi, avchd, webm, mkv files or other file types for audio data), and read out from the storage 204 by the device-independent source separation model 202. In one or more implementations, the device-independent audio data may also be provided (e.g., from storage 204) to one or more other processes (e.g., audio-based process(es) 206) separate from the device-independent source separation model 202.

For example, the audio-based process(es) 206 may generate an output based on the device-independent audio data. As examples, the audio-based process(es) 206 may include a lightweight source separation model (e.g., a source separation model of the same type as the device-independent source separation model 202, but having fewer nodes, weights, and/or parameters for low footprint local operations at the electronic device 100), a voice assistant model, or other voice or sound activated processes that can (e.g., temporarily) operate based on the device-independent audio data prior to (or in parallel with) the generation of the isolated sound data by the device-independent source separation model 202. For example, the audio-based process(es) 206 may initially operate based on the device-independent audio data from the device-specific audio generalizer (e.g., while the device-independent source separation model 202 is running on the device-independent audio data) and then operate based on the isolated sound data from the device-independent source separation model 202 when the isolated sound data becomes available from the device-independent source separation model 202.

As illustrated by FIG. 2, the microphone data may be a first representation of an audio input to an electronic device, the first input including one or more features of the microphones that generated the microphone data, and the device-independent audio data may be a second representation of the audio input, different from the first representation, and independent of the features of the microphones that captured the microphone data. In one or more implementations, the device-specific audio generalizer 200 may perform a transform, such as an ambisonics transform, on the microphone data to generate the device-independent audio data. In one or more other implementations, the device-specific audio generalizer 200 may be implemented as a machine learning model that learns a device-independent representation of the microphone data.

Figure 3:
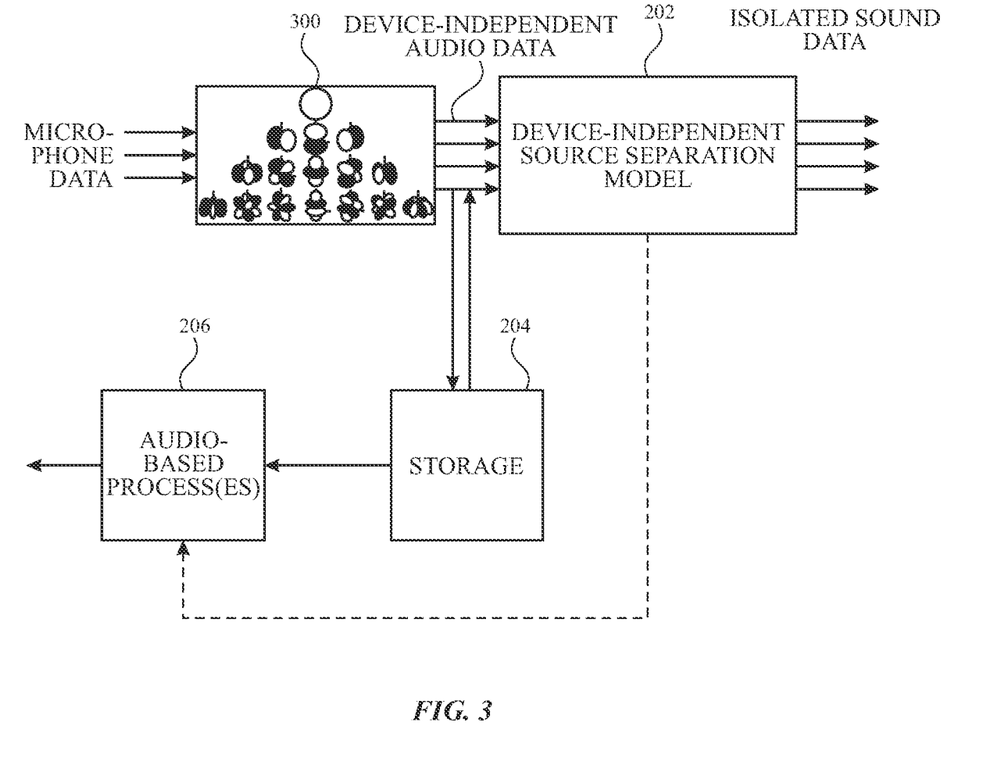
FIG. 3 illustrates a schematic diagram of an electronic device generating ambisonics data as device-independent audio data in accordance with various aspects of the subject technology.

FIG. 3 illustrates an example of an implementation in which the device-specific audio generalizer 200 may perform a transform, such as an ambisonics transform, on the microphone data to generate the device-independent audio data (e.g., a representation of the audio input that was captured in the microphone data, and that is independent of the features and/or characteristics of the microphones that captured the microphone data). In the example of FIG. 3, the device-specific audio generalizer 200 is implemented as an ambisonics transform 300. For example, the ambisonics transform 300 may be a first order ambisonics (FOA) transform that, when applied to the microphone data from multiple microphones 116, reprojects the individual microphone signals onto a set of spherical harmonics (e.g., into four channels corresponding to a zeroth order spherical harmonic, or omni channel, and three first order spherical harmonics) to generate a new representation, independent of the locations of the microphones 116, of the audio input. In this example, the device-independent audio data includes a representation of the audio input to the electronic device 100 in the ambisonics domain, in which each channel of the representation in the ambisonics domain has been projected onto one of the set of spherical harmonics. In this example, the device-independent source separation model 202 is configured to receive the representation of the audio input in the ambisonics domain as an input. The device-independent source separation model 202 may then output the isolated sound data in the same ambisonics domain, in another ambisonics projection, or as single channel audio data (e.g., non-ambisonics audio data) as described in connection with FIG. 2.

Figure 4:
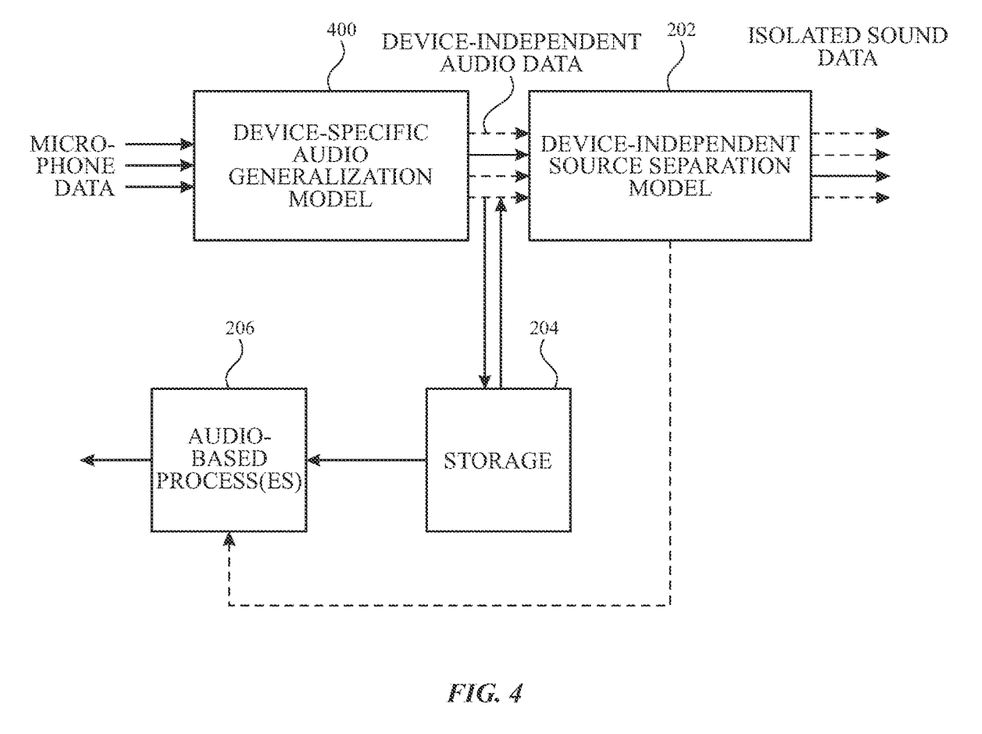
FIG. 4 illustrates a schematic diagram of an electronic device generating device-independent audio data with a trained machine learning model in accordance with various aspects of the subject technology.

FIG. 4 illustrates an example of an implementation in which the device-specific audio generalizer 200 is implemented as a machine learning model that learns a device-independent representation of the microphone data. In the example of FIG. 4, the device-specific audio generalizer 200 is implemented as a device-specific audio generalization model 400. For example, the device-specific audio generalizer 200 may include a neural network that is trained to generate device-independent audio data responsive to receiving (e.g., device-specific) microphone data (e.g., from multiple microphones of an electronic device). For example, the device-independent audio data generated by the device-specific audio generalization model 400 may be projected onto one or more learned bases (e.g., different from the spherical harmonic bases of the ambisonics transformation 300 of FIG. 3) to form a new representation of the audio input to the electronic device 100 that is independent of the electronic device 100 (e.g., independent of the locations and/or other characteristics of the microphones 116 of the electronic device 100).

For example, the learned bases may have been learned by the device-specific audio generalization model 400 during a training operation in which one or more weights and/or other parameters of the device-specific audio generalization model 400 have been adjusted based on a comparison of training output data with an output of the device-specific audio generalization model 400 generated in response to input training data. The input training data for the device-specific audio generalization model 400 may be microphone data generated with the same microphones 116 of the electronic device 100, and/or with other microphones of other electronic devices having the same respective locations, on or within the other electronic devices, as the respective locations of the microphones 116 of the electronic device 100 on which the device-specific audio generalization model 400 is deployed. In this way, device-specific input training data may be used for training the device-specific audio generalization model 400. The output training data for the device-specific audio generalization model 400 may include device-independent audio data corresponding to the device-specific input training data. In one or more implementations, the device-independent audio data that is used as output training data for the device-specific audio generalization model 400 may be used an input training data for the device-independent source separation model 202. In one or more implementations, isolated sound data corresponding to the device-independent audio data may be used as training output data for the device-independent source separation model 202.

In one or more implementations, the device-specific audio generalization model 400 may be a lightweight (e.g., relative to the device-independent source separation model 202) spatial feature extraction model that receives microphone data as input and, responsively, outputs individual features of the audio content in the microphone data. In this example, the features output from the device-specific audio generalization model 400 may be lower quality audio features (e.g., including more residual portions of other audio sources) than the audio features output from the device-independent source separation model 202.

The features output from the device-specific audio generalization model 400 may be device-independent (e.g., independent of the locations of the microphones 116), and may thus be provided to the device-independent source separation model 202 (e.g., to extract higher quality audio features). For example, the device-independent source separation model 202 may then generate improved extracted audio features using the features output from the device-specific audio generalization model 400 as inputs. In this example, the features output from the device-specific audio generalization model 400 may be provided (e.g., via storage 204) to the audio-based process(es) 206 initially (e.g., while the outputs from the device-independent source separation model 202 are being generated), and the audio features output from the device-independent source separation model 202 may be subsequently provided to the audio-based process(es) 206.

Figure 5:
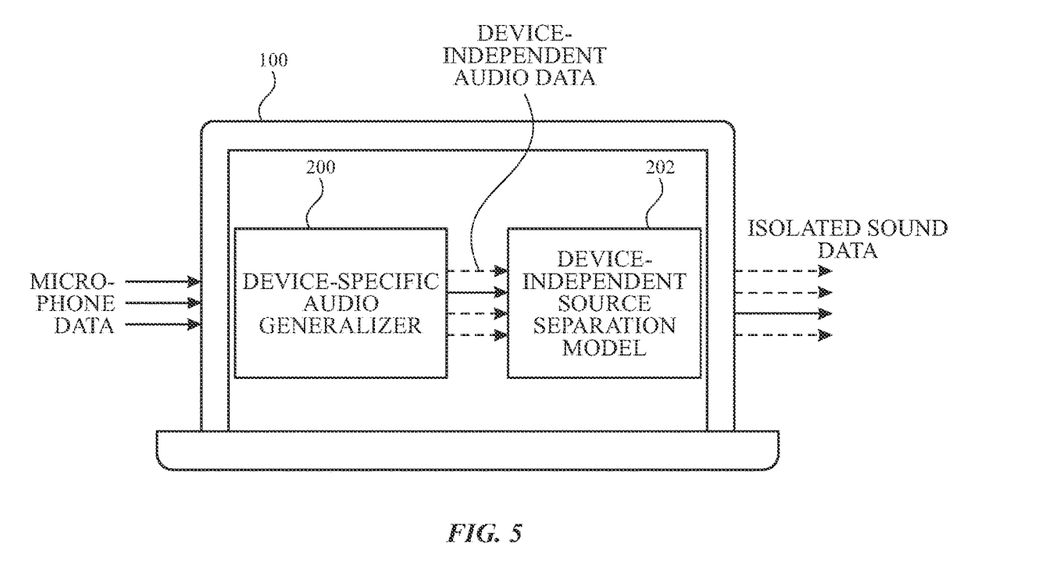
FIG. 5 illustrates a schematic diagram of an electronic device that generates device-independent audio data and includes a device-independent source separation model in accordance with various aspects of the subject technology.

In various implementations, the device-specific audio generalizer 200 (e.g., the ambisonics transformation 300 or the device-specific audio generalization model 400) and the device-independent source separation model 202 may be deployed on the same electronic device or different electronic devices. For example, FIG. 5 illustrates an implementation in which the device-specific audio generalizer 200 and the device-independent source separation model 202 are deployed at the electronic device 100. In one or more implementations, the device-specific audio generalizer 200 and/or the device-independent source separation model 202 may have been trained at the electronic device 100 and/or at another electronic device (e.g., a server). In one or more implementations, the device-specific audio generalizer 200 may have been trained at the electronic device 100, and the device-independent source separation model 202 may have been trained at another electronic device (e.g., a server) and deployed to the electronic device 100 and/or one or more (e.g., many, such as thousands, hundreds of thousands, or millions of) other electronic devices (e.g., other electronic devices of the same device type and/or other electronic devices of other device types).

Figure 6:
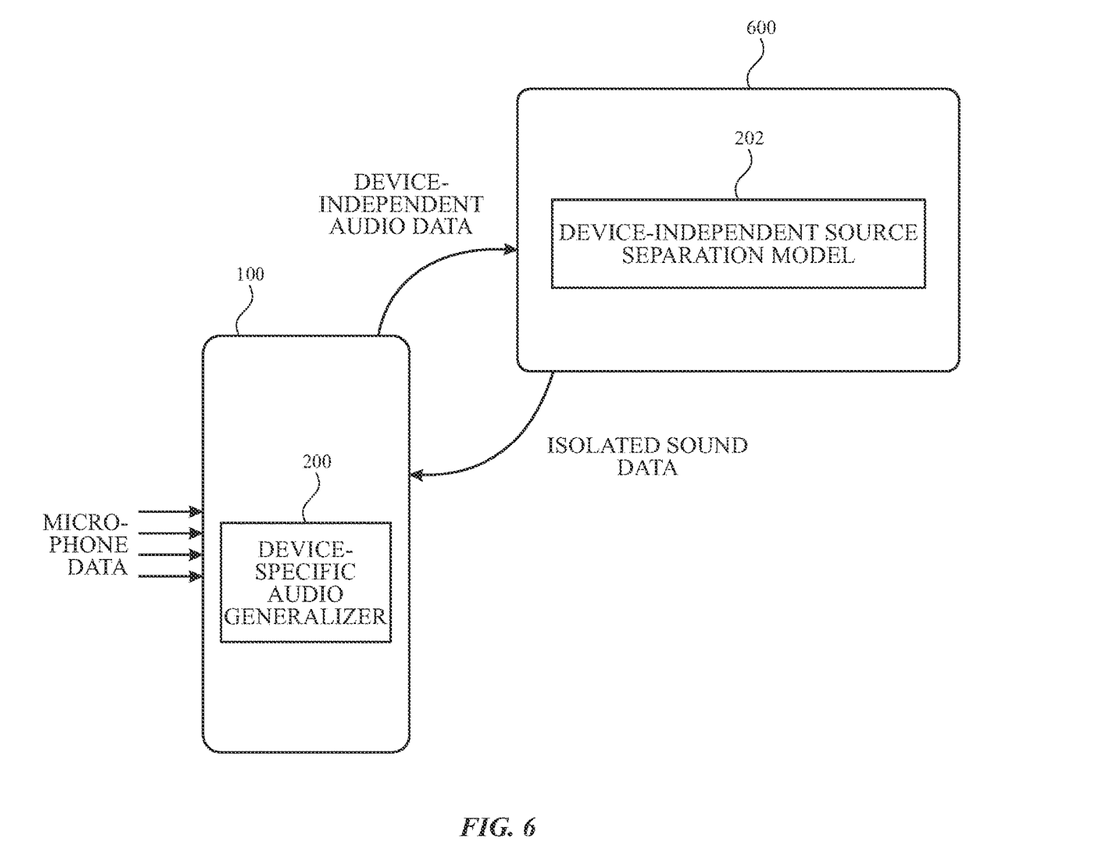
FIG. 6 illustrates a schematic diagram of an electronic device providing device-independent audio data generated at the electronic device to another electronic device having a device-independent source separation model in accordance with various aspects of the subject technology.

FIG. 6 illustrates an implementation in which the device-specific audio generalizer 200 is deployed at the electronic device 100 and the device-independent source separation model 202 is deployed at another electronic device, such as the electronic device 600. The electronic device 600 may be a companion device of the electronic device 100 (e.g., an electronic device that is paired with and can be connected to the electronic device 100), may be another electronic device of the same user as the user of the electronic device 100 (e.g., the electronic device 100 and the electronic device 600 may be registered to the same user account), and/or may be a remote device such as a server. The electronic device 600 may include one or more components, such as a housing, a display, one or more speakers, one or more microphones, and/or communications circuitry. The electronic device 100 and the electronic device 600 may have the same form factor or different form factors. As examples, the electronic device 600 may be implemented as a laptop computer or a desktop computer, a tablet device, a smart phone, a server, or other device.

As shown in FIG. 6, the microphone data from the microphones 116 of the electronic device 100 may be provided to the device-specific audio generalizer 200 (e.g., the ambisonics transformation 300 or the device-specific audio generalization model 400) at the electronic device 100. The device-specific audio generalizer 200 at the electronic device 100 may generate the device-independent audio data as described herein, and may provide (e.g., transmit using the communications circuitry 115 of FIG. 1) the device-independent audio data to the electronic device 600. In one or more implementations, a copy of the device-independent audio data may also be stored (e.g., temporarily) at the electronic device 100 (e.g., in storage such as the storage 204 described herein) and/or provided to audio-based process(es) 206 at the electronic device 100 (e.g., in parallel with providing the device-independent audio data to the electronic device 600).

As illustrated in FIG. 6, the device-independent audio data may be provided to the device-independent source separation model 202 at the electronic device 600. The device-independent source separation model 202 at the electronic device 600 may, responsively, generate isolated sound data as described herein, and provide (e.g., transmit) the isolated sound data back to the electronic device 100. The electronic device 100 may then utilize the isolated sound data locally at the electronic device 100 and/or transmit some or all of the isolated sound data to another electronic device (e.g., other than the electronic device 600, such as an electronic device that is connected to call, audio conference, or video conference with the electronic device 100). In one or more implementations, the electronic device 100 may use the isolated sound data from the device-independent source separation model 202 at the electronic device 100 to generate spatial and/or cinematic audio content (e.g., to accompany video content recorded by the electronic device). The spatial and/or cinematic audio content generated from the isolated sound data may be output by the electronic device 100 such that a listener perceives the isolated sounds in the isolated sound data as being emitted from corresponding locations (e.g., locations corresponding to the locations of the sources of the isolated sounds) in the physical environment of the electronic device (e.g., irrespective of the orientation of the electronic device 100 and/or the speakers 114 thereof).

Various examples are described herein in which the device-independent audio data from the device-specific audio generalizer 200 is provided to a device-independent source separation model 202. However, this is merely illustrative and, in other implementations, the device-independent audio data from the device-specific audio generalizer 200 may be provided to other types of audio processing models and/or other audio-based processes that utilize device-independent audio data.

Figure 7:
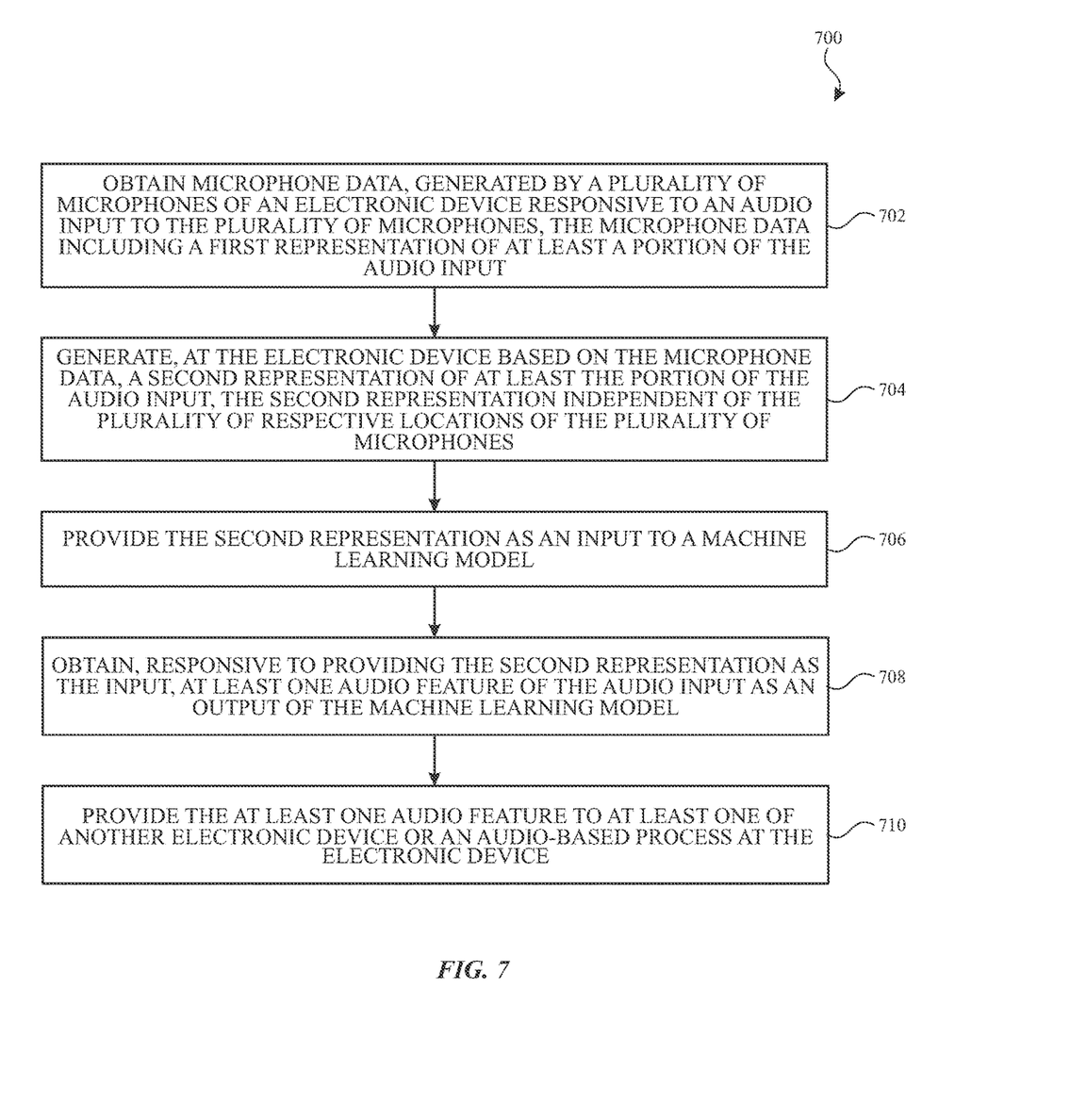
FIG. 7 illustrates a flow chart of illustrative operations that may be performed for providing device-independent audio in accordance with various aspects of the subject technology.

FIG. 7 illustrates a flow diagram of an example process for providing device-independent audio, in accordance with one or more implementations. For explanatory purposes, the process 700 is primarily described herein with reference to the electronic device 100 of FIG. 1. However, the process 700 is not limited to the electronic device 100, and one or more blocks (or operations) of the process 700 may be performed by one or more other components and other suitable devices. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

In the example of FIG. 7, at block 702, microphone data, generated by microphones (e.g., microphones 116) of an electronic device (e.g., electronic device 100) responsive to an audio input (e.g., audio input 121 and/or audio input 123) to the microphones may be obtained. The microphones may be disposed at respective locations on or in the electronic device (e.g., attached to and/or disposed within a housing of the electronic device). The microphone data may include a first representation (e.g., one channel of microphone data for each microphone) of at least a portion of the audio input, the first representation including at least one feature corresponding to the plurality of respective locations of the plurality of microphones. For example, the at least one feature may include an acoustic effect of the local acoustic environment of one of the microphones on the microphone data. As another example, the at least one feature may be a larger amplitude of a component of the microphone data of one microphone than the amplitude of that same component in the microphone data of another microphone (e.g., if the source of that component of the microphone data is closer to the one microphone than the other microphone).

At block 704, a second representation of at least the portion of the audio input may be generated (e.g., by the device-specific audio generalizer 200) at the electronic device based on the microphone data, the second representation independent of the plurality of respective locations of the plurality of microphones.

At block 706, the second representation may be provided as an input to a machine learning model (e.g., the device-independent source separation model 202 as described herein). In one or more implementations, the machine learning model may be disposed at the electronic device (e.g., as in the example of FIG. 5). In one or more other implementations, the machine learning model may be disposed at another electronic device (e.g., the electronic device 600 as in the example of FIG. 6).

In one or more implementations, generating the second representation at block 704 may include applying an ambisonics transformation to the microphone data (e.g., as described in connection with FIG. 3) to generate the second representation in an ambisonics domain.

In one or more other implementations, generating the second representation at block 704 may include providing the microphone data to another machine learning model at the electronic device, the other machine learning model having been trained to generate the second representation that is independent of the plurality of respective locations of the plurality of microphones of the electronic device (e.g., as described herein in connection with FIG. 4). For example, the other machine learning model may have been trained using training input data generated using microphones disposed at the same respective locations on or in the electronic device or another electronic device (e.g., another device having the same form factor and the same physical distribution of microphones). The machine learning model may have a first size that is larger than a second size of the other machine learning model. For example, the machine learning model may have more nodes, weights, and/or other parameters than the other machine learning model.

In one or more implementations, the machine learning model is configured to receive the second representation in the ambisonics domain as the input. In one or more other implementations, the machine learning model is configured to receive the second representation generated as an output of the other machine learning model as the input to the machine learning model.

At block 708, at least one audio feature (e.g., isolated sound data) of the audio input may be obtained as an output of the machine learning model, responsive to providing the second representation as the input. For example, the at least one audio feature may include a voice of a person speaking in a physical environment of the electronic device. The at least one audio feature may be a single channel output having audio content corresponding to single one of several audio sources (e.g., the first audio source 122 or the second audio source 124 of FIG. 1) in the physical environment of the electronic device. The at least one audio feature may include one or more additional audio channels each including audio content corresponding another single one of the several audio sources (e.g., the other one of the first audio source 122 and the second audio source 124 of FIG. 1) in the physical environment of the electronic device.

At block 710, the at least one audio feature may be provided to at least one of: another electronic device (e.g., as part of a phone call, an audio conference, a video conference, a gaming application, or other interactive experience with the other electronic device) or an audio-based process (e.g., audio-based process(es) 206, such as a self-voice feedback process, a voice-assistant process, or other voice-activated or voice-controlled process) at the electronic device.

In one or more implementations, the process 700 may also include storing, at the electronic device (e.g., in storage 204), the second representation that is independent of the plurality of respective locations of the plurality of microphones. The process 700 may also include obtaining, by a process (e.g., audio-based process(es) 206) running at the electronic device separately from the machine learning model, the second representation that is independent of the plurality of respective locations of the plurality of microphones; and generating, by the process, an output that is based on the second representation that is independent of the plurality of respective locations of the plurality of microphones.

The present disclosure recognizes that the use of such personal information data, in the present technology, can be used to the benefit of users. For example, the personal information data can be used for generating and/or using device-independent audio. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of generating and/or using device-independent audio, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 8:
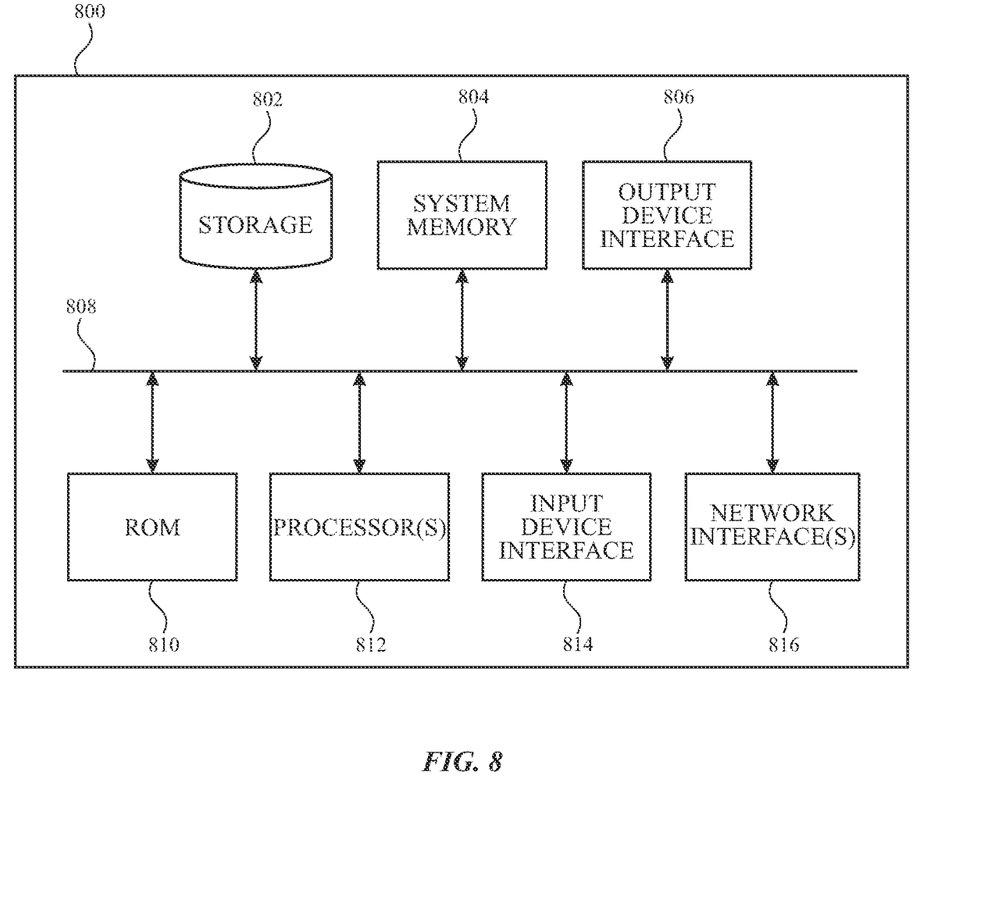
FIG. 8 illustrates an electronic system with which one or more implementations of the subject technology may be implemented.

FIG. 8 illustrates an electronic system 800 with which one or more implementations of the subject technology may be implemented. The electronic system 800 can be, and/or can be a part of, one or more of the electronic device 100 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802. ROM 810, storage 802, and/or system memory 804 may store executable code (e.g., executable by the processor(s) 812 for one or more applications, such as a telephony application, a mail application, a browser application, a media player application, a video conferencing application, a recording application, a messaging application, a calendar application, a fitness application, a mapping application, a payment processing application, a device location application, a word processing application, a presentation application, and/or any other end-user application.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, microphones, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, a speaker or speaker module, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method, comprising:
   obtaining microphone data, generated by a plurality of microphones of an electronic device responsive to an audio input to the plurality of microphones, wherein the plurality of microphones are disposed at a plurality of respective locations on or in the electronic device, and wherein the microphone data includes a first representation of at least a portion of the audio input, the first representation including at least one feature corresponding to the plurality of respective locations of the plurality of microphones;
   generating, at the electronic device based on the microphone data, a second representation of at least the portion of the audio input, the second representation independent of the plurality of respective locations of the plurality of microphones;
   providing the second representation as an input to a machine learning model;
   obtaining, responsive to providing the second representation as the input, at least one audio feature of the audio input as an output of the machine learning model; and
   providing the at least one audio feature to at least one of: another electronic device or an audio-based process at the electronic device.

2. The method of claim 1, wherein the machine learning model is disposed at the electronic device.

3. The method of claim 1, wherein the machine learning model is disposed at another electronic device.

4. The method of claim 1, wherein generating the second representation comprises applying an ambisonics transformation to the microphone data to generate the second representation in an ambisonics domain, and wherein the machine learning model is configured to receive the second representation in the ambisonics domain as the input.

5. The method of claim 1, wherein generating the second representation comprises providing the microphone data to another machine learning model at the electronic device, the other machine learning model having been trained to generate the second representation that is independent of the plurality of respective locations of the plurality of microphones of the electronic device.

6. The method of claim 5, wherein the other machine learning model has been trained using training input data generated using a plurality of microphones disposed at the same plurality of respective locations on or in the electronic device or another electronic device.

7. The method of claim 5, wherein the machine learning model has a first size that is larger than a second size of the other machine learning model.

8. The method of claim 1, further comprising storing, at the electronic device, the second representation that is independent of the plurality of respective locations of the plurality of microphones.

9. The method of claim 8, further comprising:
   obtaining, by a process running at the electronic device separately from the machine learning model, the second representation that is independent of the plurality of respective locations of the plurality of microphones; and
   generating, by the process, an output that is based on the second representation that is independent of the plurality of respective locations of the plurality of microphones.

10. The method of claim 1, wherein the at least one audio feature comprises a voice of a person speaking in a physical environment of the electronic device.

11. A non-transitory computer-readable medium storing instructions which, when executed by one or more processors, cause the one or more processors to:
    obtain microphone data, generated by a plurality of microphones of an electronic device responsive to an audio input to the plurality of microphones, wherein the plurality of microphones are disposed at a plurality of respective locations on or in the electronic device, and wherein the microphone data includes a first representation of at least a portion of the audio input, the first representation including at least one feature corresponding to the plurality of respective locations of the plurality of microphones;
    generate, at the electronic device based on the microphone data, a second representation of at least the portion of the audio input, the second representation independent of the plurality of respective locations of the plurality of microphones;
    provide the second representation as an input to a machine learning model;
    obtain, responsive to providing the second representation as the input, at least one audio feature of the audio input as an output of the machine learning model; and
    provide the at least one audio feature to at least one of: another electronic device or an audio-based process at the electronic device.

12. The non-transitory computer-readable medium of claim 11, wherein the machine learning model is disposed at the electronic device.

13. The non-transitory computer-readable medium of claim 11, wherein the machine learning model is disposed at another electronic device.

14. The non-transitory computer-readable medium of claim 11, wherein the instructions, when executed by the one or more processors, cause the one or more processors to generate the second representation by applying an ambisonics transformation to the microphone data to generate the second representation in an ambisonics domain, and wherein the machine learning model is configured to receive the second representation in the ambisonics domain as the input.

15. The non-transitory computer-readable medium of claim 11, wherein the instructions, when executed by the one or more processors, cause the one or more processors generate the second representation by providing the microphone data to another machine learning model at the electronic device, the other machine learning model having been trained to generate the second representation that is independent of the plurality of respective locations of the plurality of microphones of the electronic device.

16. A device, comprising:
a plurality of microphones disposed at a plurality of respective locations on or in the device;
a memory; and
one or more processors configured to:
obtain microphone data, generated by the plurality of microphones responsive to an audio input to the plurality of microphones, and wherein the microphone data includes a first representation of at least a portion of the audio input, the first representation including at least one feature corresponding to the plurality of respective locations of the plurality of microphones;
generate, based on the microphone data, a second representation of at least the portion of the audio input, the second representation independent of the plurality of respective locations of the plurality of microphones;
provide the second representation for input to a machine learning model;
obtain, responsive to providing the second representation for the input, at least one audio feature of the audio input as an output of the machine learning model; and
provide the at least one audio feature to at least one of: another electronic device or an audio-based process at the electronic device.

17. The device of claim 16, wherein the one or more processors are further configured to store, in the memory, the second representation that is independent of the plurality of respective locations of the plurality of microphones.

18. The device of claim 17, wherein the one or more processors are further configured to:

obtain, by a process running at the electronic device separately from the machine learning model, the second representation that is independent of the plurality of respective locations of the plurality of microphones; and
generate, by the process, an output that is based on the second representation that is independent of the plurality of respective locations of the plurality of microphones.

19. The device of claim 16, wherein the at least one audio feature comprises a voice of a person speaking in a physical environment of the electronic device.

20. The device of claim 16, wherein the one or more processors are configured to provide the second representation for the input to the machine learning model by providing the second representation to another electronic device for input to the machine learning model at the other electronic device.

21. A method, comprising:
obtaining audio inputs, with a plurality of microphones of an electronic device, from of two or more audio sources at two or more respective locations in a physical environment of the electronic device;
removing, by the electronic device from the audio inputs, audio content corresponding to one of the two or more audio sources; and
storing, by the electronic device, spatial audio data that includes (i) audio content corresponding to one or more others of the two or more audio sources and (ii) one or more spatial characteristics of the one or more others of the two or more audio sources.

22. The method of claim 21, wherein the one or more spatial characteristics comprise one or more spatial locations of the one or more others of the two or more audio sources.

23. The method of claim 21, wherein the spatial audio data is represented in a format that is independent of a plurality of respective locations of the plurality of microphones with the electronic device.

24. The method of claim 21, wherein removing the audio content corresponding to the one of the two or more audio sources comprises removing the audio content corresponding to the one of the two or more audio sources after storing the spatial audio data.

25. The method of claim 21, further comprising:
providing playback of the spatial audio data in a spatial audio presentation that matches a spatial distribution in the physical environment of the one or more others of the two or more audio sources.

26. The method of claim 21, wherein removing the audio content corresponding to the one of the two or more audio sources comprises removing the audio content corresponding to the one of the two or more audio sources using a trained machine learning model.

* * * * *